Figure 1:
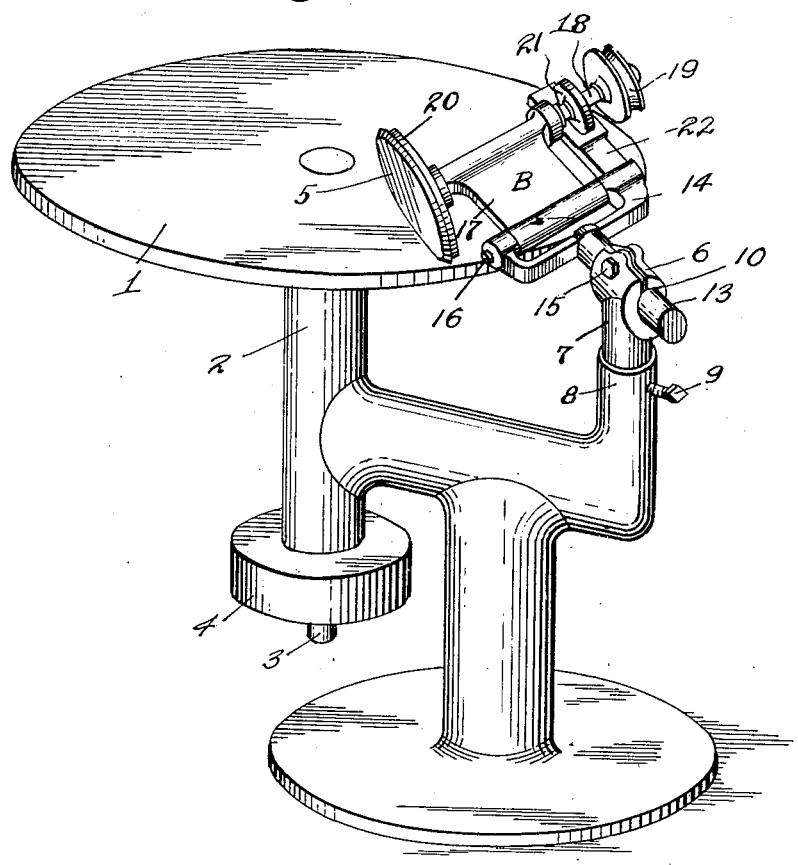

P. OKEY.
BEVELING MACHINE.
APPLICATION FILED JUNE 13, 1919.

1,370,991.

Patented Mar. 8, 1921.
2 SHEETS—SHEET 1.

Perry Okey Inventor

Witness
A. Sundell

By C. O. Shepherd Attorney

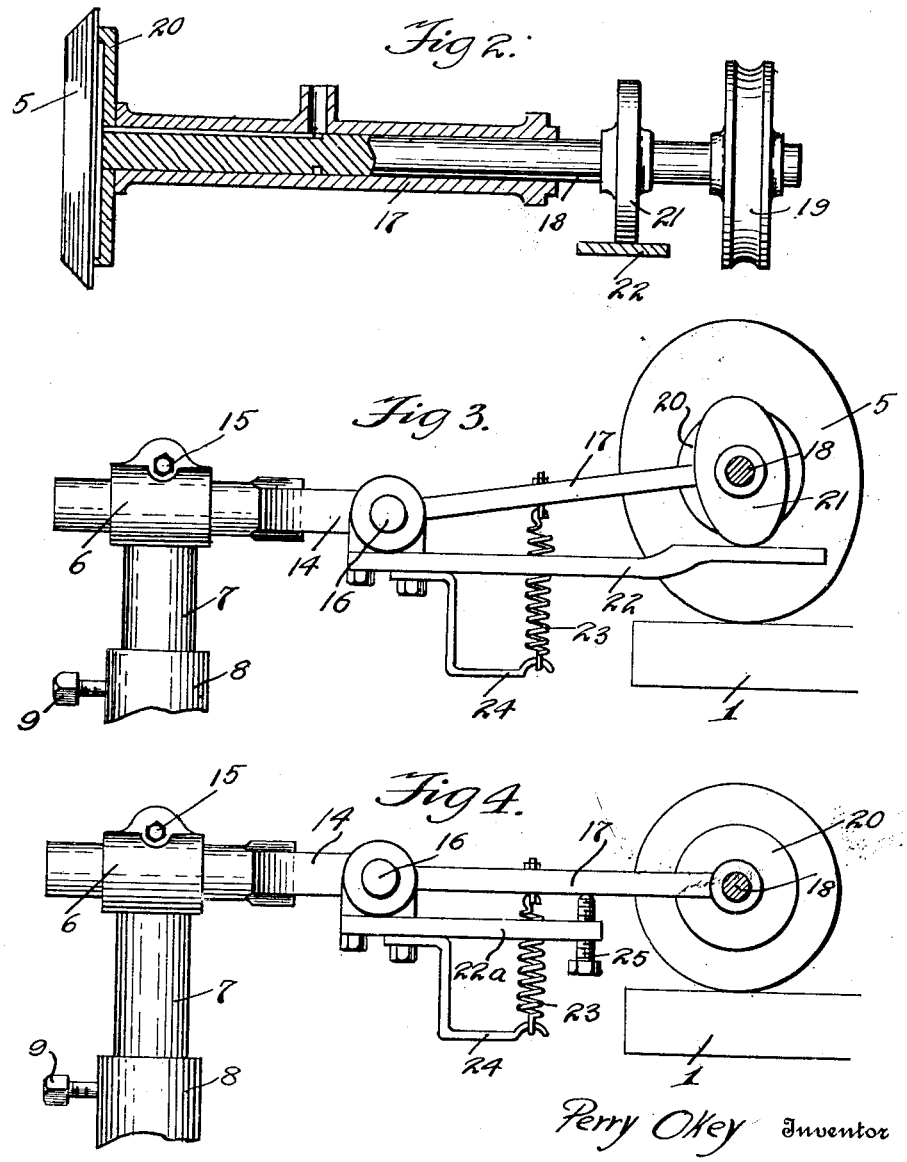

UNITED STATES PATENT OFFICE.

PERRY OKEY, OF COLUMBUS, OHIO.

BEVELING-MACHINE.

1,370,991. Specification of Letters Patent. Patented Mar. 8, 1921.

Application filed June 13, 1919. Serial No. 303,962.

*To all whom it may concern:*

Be it known that I, PERRY OKEY, a citizen of the United States, residing at Columbus, in the county of Franklin and State of Ohio, have invented certain new and useful Improvements in Beveling-Machines, of which the following is a specification.

This invention relates broadly to beveling machines, and has particular reference to beveling machines of the type employed for the purpose of producing inclined edges upon plates formed from glass or other suitable material.

The primary object of the present invention resides in the provision of an improved work supporting structure for use in connection with such machines, whereby a plate will be capable of being maintained in such relation with respect to an abrading element that beveled edges may be produced upon plates of either elliptical, circular or other contours.

Another object of the invention resides in a machine of the character stated wherein the work supporting structure consists essentially of an oscillatory bearing member movably mounted upon a pivot to assume active or inactive positions with respect to an abrading element, said member being formed to rotatably receive a work supporting spindle with which is suitably associated the plate to be ground by said element, said spindle and the pivot axis of said bearing member being located in parallel relation so that said spindle may receive and rotate plates of circular, elliptical or other formations.

With these and other objects in view, as will appear as the description proceeds, the invention accordingly consists in the novel features of construction, combination of elements and arrangement of parts, hereinafter to be fully described and have the scope thereof pointed out in the appended claims.

In the accompanying drawing:

Figure 1 is a perspective view of a plate beveling machine constructed in accordance with the principles of the invention, Fig. 2 is a vertical longitudinal sectional view taken through the bearing member in line with its spindle structure, Fig. 3 is a side elevation of the work supporting structure, and Fig. 4 is a similar view of a slightly modified form of the invention.

In the form of the invention disclosed use is made of a grinding wheel 1 or a metal disk having a powdered abrasive on its working face or an equivalent abrading element, the latter being mounted for rotation upon a suitable frame 2 and carries a depending shaft 3 to which is connected a driving pulley 4, the latter being rotated in any suitable manner so as to effect the rotation of the element 1. In order to effect the grinding or beveling of the edges of an elliptical, circular or other similar plate 5, use is made of an improved work supporting structure B, which constitutes the present invention. This structure in its preferred form consists of a split clamp 6 which is provided with a depending stud 7, the latter operating within a similarly formed bore formed in an upstanding portion 8 of the frame 2, and a set screw 9 is employed to retain the clamp 6 in its various vertically adjusted positions.

Positioned within the horizontal bore 10 of the clamp 6 is a stud 13 formed upon a yoke 14, the angularity of the latter may be controlled by rotating the stud 13 within the bore 10 of the clamp 6, and a set screw 15 is carried by said clamp to rigidly bind said yoke in any of its adjusted positions. It will be understood as the description proceeds that the angularity of the yoke 14 with respect to the abrading element 1 will control the degree of bevel of the periphery of the plate 5.

Extending through the yoke is a pivot pin 16, and mounted to swing on this pin is an oscillatory bearing member 17 which latter is constructed to move toward or away from the abrading element 1. Formed in the bearing member is a bore, through which passes a rotary spindle 18, the latter being situated in spaced parallelism with respect to the pin 16. A pulley or other equivalent structure 19 is mounted upon one end of said spindle and operates to effect the rotation of the latter within the bearing member. The opposite end of the spindle is equipped with a chuck plate 20 adapted to rotate in unison with said spindle, and suitably connected with the chuck plate is a glass plate or its equivalent 5. Any suitable mechanism may be employed for retaining the plate 5 in connection with the chuck plate, and this may be done either by suction or by a suitable adhesive.

From the foregoing it will be manifest that by revolving the bearing member 17 about its pivot 16 the plate 5 will be brought into peripheral engagement with the element 1, whereby upon the rotation of the latter a beveled edge will be produced upon said plate 5. As is stated above the angularity of this bevel may be readily controlled by vertically oscillating the yoke 14 within the clamp 6 so that more or less of the peripheral edge of said plate 5 will be presented to the abrading surface. The essential feature of the present invention resides in locating the spindle 18 in parallelism with the pivot 16, and by this arrangement of parts it is possible to bevel the edges of elliptical, circular or other similarly formed plates.

In order to limit the movement of the bearing member in a downward direction and to govern the finishing of the beveling operation, said spindle is provided with an elliptical cam 21 which, when the bevel of the plate 5 has been completed, will engage with a fixed arm 22 carried by the yoke 14. In this manner the beveling operation will be arrested at proper points or upon the completion of the bevel. A spring 23 may be utilized for the purpose of drawing the bearing member and the associated plate 5 into contact with the abrading element, and therefore the same has one of its ends connected with the member 17 and with a clip 24 carried by the arm 22, the tendency of said spring being to draw the bearing member in a downward direction so that the edge of the plate 5 will contact with the abrading element, this action being limited by the contacting of the cam 21 with the arm or other stationary abutment 22.

In the modified form of the invention shown in Fig. 4 the beveling machine is principally adapted for use in the finishing of circular plates, therefore, in order to arrest downward movement of the bearing arm it is simply necessary to provide the arm 22ª with a set screw 25, which engages with the under portion of the arm and regulates its extent of downward movement.

From the foregoing description, taken in connection with the accompanying drawing, it will be apparent that there is provided a machine which will be particularly efficient in the capacity stated. By locating the spindle 18 in parallelism with the pivot pin 16, a structure has been devised for permitting of the grinding of elliptical or circular plates and therefore it will be appreciated that the utility of the machine is considerably increased over the machines of the prior art which are limited to the grinding of but circular plates.

What I claim is:

1. In a beveling machine, a work supporting structure comprising an oscillatory bearing member, a revolubly adjustable pivot for controlling the angularity of said member with respect to an abrading element, a shaft rotatably journaled within said member and located in spaced parallelism with said pivot, means located upon one end of said shaft for supporting a plate to be ground by said element, means for adjusting the vertical height of said pivot, and means for rotating said shaft.

2. In a beveling machine, a work supporting structure comprising an oscillatory bearing member, a yoke for pivotally supporting said bearing member and positioned to permit the latter to be swung into active or inactive positions with respect to an abrading element, spring means coöperative with said bearing member and said yoke and tending to force the bearing member toward said abrading element, a clamp coöperative with said yoke to vary the angle of operation of said bearing member, stop means carried by said yoke for limiting the movement of said bearing member toward said element, a spindle journaled for rotation within said bearing member and situated in spaced parallelism with the pivot of said bearing member, and means for supporting a glass plate in rotary relation with said spindle.

3. In a beveling machine, the combination with a grinding wheel, a shaft for rotating said wheel, a work holding chuck, a chuck spindle journaled in a frame, a pivot axially parallel with said chuck spindle upon which said frame swings, a yoke carrying said frame pivot, a pivot on said yoke at right angles to said grinding wheel shaft, means for clamping said yoke pivot, means for adjusting said clamping means with relation to said grinding wheel, a cam mounted on the chuck spindle, a stop mounted on said yoke against which said cam may run, and means for rotating said chuck spindle.

In testimony whereof I affix my signature.

PERRY OKEY.